United States Patent Office 3,042,691
Patented July 3, 1962

3,042,691
5α,21-DIBROMO-6β-FLUORO-21-METHYL-PREG-NANES AND PROCESS FOR MAKING SAME
Hans-Jurgen E. Hess, Groton, and Sanford K. Figdor and George M. K. Hughes, Gales Ferry, and Walter T. Moreland, New London, Conn., assignors to Chas. Pfizer & Co., Inc., Brooklyn, N.Y., a corporation of Delaware
No Drawing. Filed May 11, 1960, Ser. No. 28,187
5 Claims. (Cl. 260—397.47)

This application is concerned with a new and useful process for the preparation of intermediates which are used to prepare the adrenocortically active compound, 6α-fluoro - 21 - methyl-Δ⁴-pregnene-11β,17α,21-triol-3,20-dione 21 acetate. This latter compound is described and claimed in copending patent application, Serial No. 3,996, filed January 22, 1960. The application concerns itself also with the process by which these valuable compounds are prepared.

The valuable compounds of this invention are represented by the formulas:

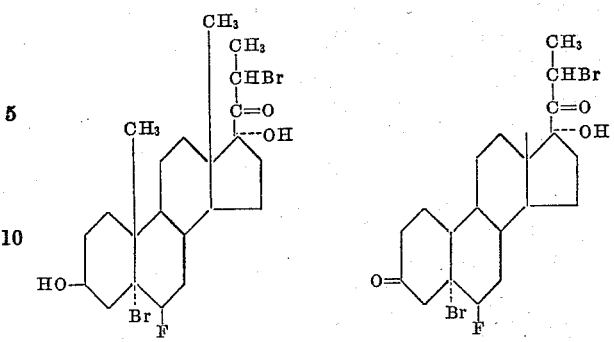

The first of these compounds 5α,21-dibromo-6β-fluoro-21-methyl-pregnane-3β,17α-diol-20-one is prepared from 5α-bromo - 6β - fluoro-21-methyl-pregnane-3β,17α-diol-20-one by reaction with bromine. The 21-desbromo starting material is prepared by the procedure described and claimed in copending and concurrently filed patent application, Serial No. 28,185, which also claims the compound itself. It may be prepared by the following sequence of reactions starting with the known compound, Δ⁵-pregnene-3β,17α-diol - 20 - one (17α-hydroxy pregnenolone).

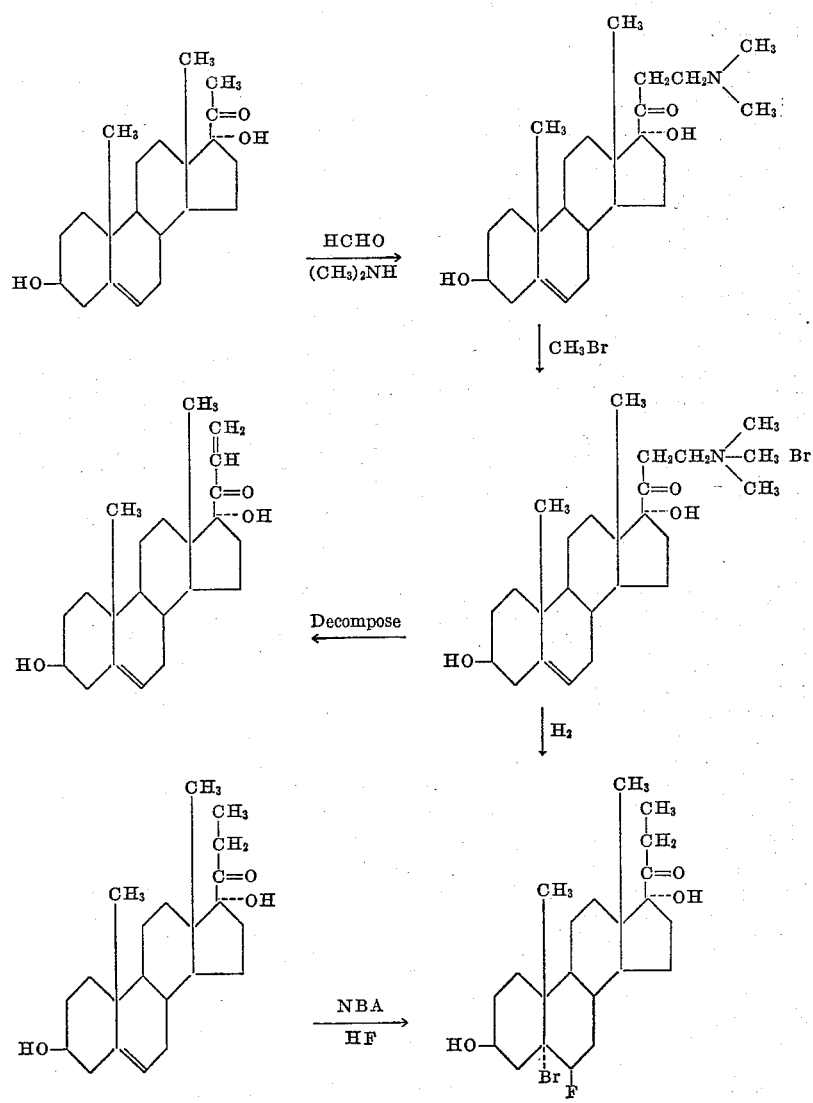

The compound, 21-dimethylaminomethyl-Δ⁵-pregnene-3β,17α-diol-20-one is prepared by reaction of 17α-hydroxy pregnenolone with formaldehyde and dimethylamine. It is converted to the quaternary bromide by reaction with methyl bromide. Treatment of the quaternary compound in aqueous solution at a pH of from about 7 to about 12 at a temperature of from about 20° C. to about 30° C. for a period of from about 1 to about 6 hours converts it to 21-methylene-Δ⁵-pregnene-3β,17α-diol-20-one, and this compound is reduced with hydrogen in the presence of a noble metal catalyst in a suitable solvent including, for example, lower aliphatic solvents such as methanol, ethanol, acetone or ethyl acetate at a temperature of from about 15° C. to about 35° C. at from about 1 to about 10 atmospheres until the theoretical amount of hydrogen is taken up.

Conversion to the desired 5α-bromo-6β-fluoro compound is accomplished by reaction with N-bromoacetamide in the presence of anhydrous hydrogen fluoride. The reaction is carried out in a solvent system consisting of tetrahydrofuran by volume. Other solvents or solvent systems, for example, dioxane and chloroform can be used, but it is preferred to use the tetrahydrofuran-methylene chloride system since reaction in this system affords crystalline products of relatively high purity.

From about 1.05 to about 1.5 molar equivalents of N-bromoacetamide are employed, preferably, from about 1.05 to about 1.15. An excess of from about 25 to about 100 molar equivalents of anhydrous hydrogen fluoride, preferably, from about 45 to about 55 molar equivalents are used.

The reaction is carried out at a temperature of from about −80° C. to about −50° C., preferably from about −80° C. to about −70° C. for a period of from about one to about sixteen hours, preferably from one to about two hours.

The product is isolated at the end of the reaction period by cautiously pouring the reaction mixture into an aqueous solution of potassium carbonate or bicarbonate containing sufficient alkaline reagent to neutralize substantially all of the acid present. The use of a sodium base is best avoided because the sodium fluoride which forms is of low solubility in water and its precipitation increases the mechanical difficulty of working with the mixture. The organic layer is separated and the aqueous layer, preferably, extracted with additional quantities of the methylene chloride or other water insoluble solvent used for the reaction. It is then washed with dilute aqueous alkaline reagent until neutral and finally with water. The desired compound is isolated from the organic layer, preferably, after drying over an anhydrous drying agent, such as anhydrous sodium sulfate by evaporation of the solvent in vacuo.

The second of the compounds illustrated above is prepared from the first by oxidation of the 3β-hydroxyl group.

In the first step of this synthetic process, the bromine is introduced at the 21-position of the 21-desbromo compound by reaction with at least a molar equivalent of bromine. The reaction is effected by treating the steroid compound with from about 1 to about 1.5 molar equivalents of bromine at a temperature of from about 0° C. to about 40° C., preferably, 15° C. to 30° C. for a period of from about one-half to about four hours.

Suitable solvents include hydrocarbon and halogenated hydrocarbon solvents containing up to seven carbon atoms and acetic acid. Methylene chloride, ethylene chloride, chloroform, carbon tetrachloride, hexane, octane, benzene, toluene, and chlorobenzene may be mentioned by way of example. Mixtures of solvents can also be employed.

In a preferred method, the steroid is taken up in the selected solvent and one molar equivalent of a bromine solution comprising bromine dissolved in the same solvent is added while maintaining the temperature at from about 20° C. to about 30° C. The mixture is then allowed to stand at this same temperature until most of the bromine color has disappeared. This usually takes less than an hour.

The product may be isolated by any of a number of means known to those skilled in the art. In one especially suitable method, a slight vacuum is first applied to the mixture to remove most of the hydrogen bromide which forms in the reaction. The solution is then washed with an alkaline reagent and with water. Suitable alkaline reagents include, for example, 5% aqueous sodium carbonate, bicarbonate, hydroxide or equivalent potassium salts. The organic layer is then dried over an anhydrous drying agent such as sodium or magnesium sulfate, filtered and the solvent removed in vacuo to leave the desired product as a residue.

The hydroxyl group at the 3-position is next oxidized to form a 3-keto compound. The choice of oxidizing agent is not critical although it is preferred to use chromic acid in accordance with standard procedures. One procedure which is especially effective is to use 8N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be used.

As stated above, the compounds and process of this invention are useful in the preparation of the adrenocortically active steroid 6α-fluoro-21-methyl-11β,17α,21-triol-3,20-dione 21-acetate. This is accomplished by the following sequence of reactions.

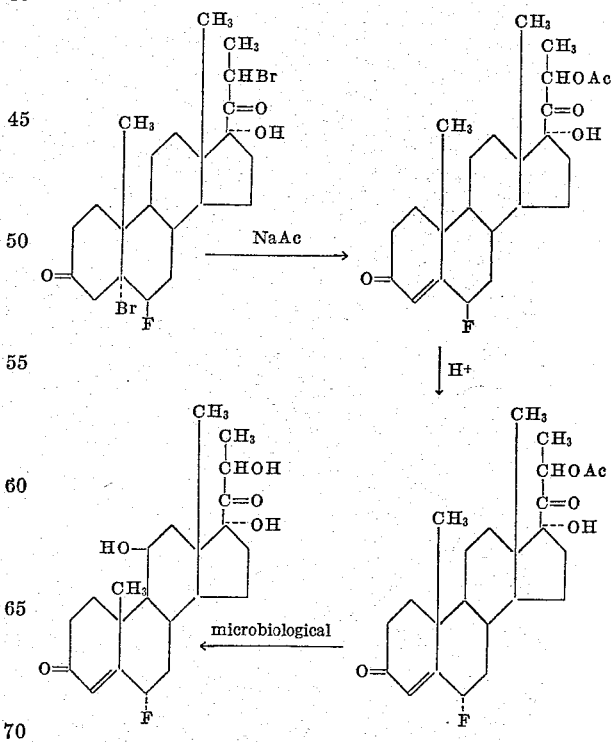

In the first step of the above sequence, the 5α-bromine atom is removed and the bromine atom at the 21-position is replaced with an acetoxy group. This is accomplished by heating the steroid compound in a reaction inert lower aliphatic oxygenated organic solvent containing up to nine carbon atoms in the presence of an sodium or potassium acetate. Suitable solvents include, for example, methanol, ethanol, propanol, ethyl acetate, methyl propionate, methyl isopropyl ketone or di-n-butyl ketone.

At least a molar equivalent, i.e. two molar proportions of sodium or potassium acetate, and preferably, an excess of from about 30% to 200% should be used.

The temperature range for obtaining optimum yields is from about 50° C. to about 130° C. The duration of the reaction is from about one-half to about four hours. It is preferred to carry the reaction out at temperature range of from about 50° C. to about 75° C. for a period of from about one-half hour to about one hour. It is convient to select a solvent with a boiling point under atmospheric conditions, with the temperature range and to reflux the reaction mixture for the selected period of time.

Refluxing the steroid in methanol in the presence of sodium acetate for a period of about forty minutes provides very good yields.

The product is isolated in accordance with standard means known in the art. For example, it can be precipitated by the addition of water if the reaction solvent is water miscible. Alternatively, with a water immiscible solvent, the solvent may be evaporated in vacuo and the product purified by washing the residue with water. Further purification may be affected by recrystallization from isopropanol or other suitable solvent or by trituration with ethyl acetate.

The 6$\beta$-fluoro atom is next isomerized to form a 6$\alpha$-fluoro compound. This is accomplished by treatment of the 6$\beta$-epimer with a prototropic agent such as water, alcohols, organic acids and mineral acids. Of these, mineral acids such as hydrochlorid, hydrobromic, sulfuric and phosphoric are preferred. The reaction is carried out at from about −5° C. to about 10° C. for from about 2 to about 4 hours. In preferred operations, reaction is effected at from about 0° C. to about 10° C. for from about 2½ hours to about 3 hours. Suitable solvents for carrying out the reaction include halogenated hydrocarbons containing up to two carbon atoms and aliphatic acids as alkanols containing up to three carbon atoms or mixtures of these solvents. There may be mentioned by way of example methanol, ethanol, propanol, carbon tetrachloride, methylene chloride and chloroform. In a preferred embodiment of the process, the 6$\beta$-epimer, dissolved in chloroform and absolute methanol is treated with anhydrous hydrogen chloride for about 3 hours at 0° C. to 10° C. At the end of this period, the reaction mixture is diluted with chloroform, washed successively with sodium bicarbonate and water, dried and evaporated to dryness in vacuo. The product is obtained as a residue and may be purified by recrystallization using, for example, a mixture of isopropanol and methylene chloride.

The amount of isomerizing agent used in converting the 6$\beta$-epimer to the 6$\alpha$-epimer is not critical. Theoretically, extremely small amounts of reagent are capable of effecting the desired result. In preferred operations, an anhydrous hydrogen halide, suitably hydrogen chloride or hydrogen bromide, is bubbled through the mixture until substantially all of the fluorine has been epimerized. However, other prototropic agents can be used, either organic or inorganic in aqueous or anhydrous form. As much as 50% by volume or even more of acid can be used to effect the desired result.

Introduction of the 11$\beta$-hydroxyl group to effected microbiologically. A number or organisms are known in the art which are capable of 11$\beta$-hydroxylation. Organisms of the genus Curvularia, for instance, *Curvularia lunata* NRRL 2380 as described and claimed in U.S Patent 2,658,023, issued November 3, 1953 may be mentioned by way of example. Organisms of the genus Chaetomella, Spondylocladium or Epicoccum can also be used in accordance with the procedures described and claimed in U.S. Patents 2,882,205; 2,876,170 and 2,875,134 respectively. Other organisms which will accomplish this same result are known in the art.

There are several procedures which may be used for the hydroxylation. In the first of these, nutrient media are seeded with slants of the selected organism. Such a medium may consist, for example, of a mixture of standard bacteriological nutrient broth base, together with added carbohydrate. The cultivation of the various organisms in accordance with this procedure has been described in considerable detail in many publications. The seeded, sterile nutrient solutions may be grown in shake flasks for two to three days to provide inoculum for larger vessels and in turn, the larger, stirred, aerated vessels may be used for the inoculation of full production scale vessels for submerged fermentation. The same medium of the type described above may be used for the large scale hydroxylation of steriods according to this process. Considerable variation may, of course, be made in the medium. In general, there is required a carbohydrate, a source of organic nitrogen, mineral salts and various trace metals.

Rather than conducting the hydroxylation in the presence of the whole fermentation broth, the cells may be removed from growing cultures and these may be resuspended in a medium which is designated the enzyme reaction mixture. Such a mixture may consist, for example, of a solution which is 0.01 molar in sodium fumarate or other hydrogen acceptor or in magnesium sulfate and 0.03 molar in sodium citrate. The presence of a certain amount of adenosine triphosphate, for example, 0.125% is also quite useful. Centrifugal, washed cells of the chosen organism may be suspended in this type of reaction mixture which is adjusted to a pH of about 6, for example, with citric acid. After addition of the steroid compound which it is desired to hydroxylate, the mixture may be incubated at about 37° C. and samples may be removed from time to time to determine the point at which maximum conversion of the steroid has taken place. In general, this occurs after about one to several days. The cells from about 100 ml. of the stirred, aerated cultures may be suspended in about 20 ml. of an enzyme reaction mixture for suitable results. Considerable variation may be made in these proportions. The steroid compound may be used in a proportion of about 25 to about 200 mg./ml. of the enzyme reaction mixture. The compound in solid form is merely added to the medium after the adjustment of the pH. The flasks are stoppered with cotton so that they are exposed to the air during the incubation. It is preferred to use a small volume compared to the volume of the flask, for example, 20 ml. in a 125 ml. Erlenmeyer flask. Alternatively, the mixture may be stirred and aerated. In general, a hydrogen acceptor, a divalent metal, particularly magnesium and a buffer are required in the medium.

Rather than removing the cells and carrying out the reaction in an enzyme reaction mixture, the steroid compound may be added directly to a sterilized portion of the nutrient medium such as is described above and the medium is then seeded wtih the chosen organism. Approximately, the same proportion of chosen steroid compound may be used in this case also. Samples of the agitated aerated mixture may be removed at intervals for determination of the conversion of the steroid compound to the oxidized products. The mixture is maintained at between 20° C. and 37° C. or higher during the growth of the cells and the conversion of the steroid. In general, one-half to seven days are required for maximum production of the dehydrogenated compounds. Alternatively, the growth of cells may be established before the addition of the steroid.

A third method which is also very useful for the hydroxylation of the substrate involves the use of oxidizing enzymes produced by the organism. These may be prepared by a variety of methods from the cells of the organism. These materials may be released from the cells by different procedures. These include grinding, particularly with abrasive materials such as powdered glass or sand which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° C. to about 50° C. The cells disintegrate within one to several days and the cell residue may be removed by filtration, for example, through a Seitz filter or through a sintered glass bacterial filter. A third method for preparing cell-free elaboration products of an organism used for dehydrogenation is by repeated, rapid freezing and thawing of the cellular material. Another method is by the use of ultrasonic energy to rupture the cells. One further method of use for the same purpose is by the use of a water miscible solvent, particularly acetone. The cells when placed in such a solvent are ruptured and an extract of the desired enzyme is obtained. The enzymes may be used for hydroxylation in media similar to those used with the grown cells, that is, one containing a hydrogen acceptor such as fumarate, a buffer and in some cases, a bivalent metal, particularly, magnesium as well as a minor proportion of adenosine triphosphate. The cell-free enzymes of the organism may be used in media indicated above at a temperature of about 20° C. to about 40° C. In general, the hydroxylation of the desired steroid compound is brought about in a period of from a few hours to several days. The optimum time and temperature and other condtions may readily be determined by a minimum of experimentation. Detailed descriptions of suitable media for both the use of isolated, resuspended cells and of cell-free elaboration products are given in the textbooks Manometric Techniques in Tissue Metabolism by W. W. Umbreit et al., Burgess Publishing Company, Minneapolis (1949) and Respiratory Enzymes by H. Lardy, Burgess Publishing Company, Minneapolis (1949).

Although the compounds prepared by the process of this invention are disclosed above as specifically useful for the preparation of the adrenocortically active steroid, 6α-fluoro-21-methyl-$\Delta^4$-pregnene-11β,17α,21-triol-3,20-dione 21-acetate, they are not limited to this use. Other valuable 6α-fluoro-21-methyl-adrenocortically active steroids can be prepared from them. For example, 6α-fluoro-21-methyl-$\Delta^4$-pregnene-11β,17α,21-triol-3,20-dione 21-acetate can be converted to the corresponding $\Delta^{1,4}$-compound with selenium dioxide or to the $\Delta^{1,4}$-21-free alcohol microbiologically, for example, with the known dehydrogenating organism, *Corynebacterium simplex*. These compounds, i.e., the $\Delta^4$- and the $\Delta^{1,4}$-compounds can also be converted to the corresponding 6,9-difluoro compounds. The procedure used involves dehydration to form a $\Delta^{9(11)}$-compound using for example, methane sulfonyl chloride in pyridine; formation of a 9,11-bromohydrin with N-bromoacetamide and aqueous perchloric acid; formation of a 9β,11β-epoxide with potassium acetate or equivalent alkaline reagent and finally formation of a 9,11-fluorohydrin by opening the epoxide ring with anhydrous hydrogen fluoride. In the event that the initial compound in this series of reactions contains a non-esterified hydroxyl group at the 21-position, it should first be esterified, for example, by reaction with acetic anhydride and pyridine. Specific procedures for these reactions are set forth in detail in copending and concurrently filed patent application, Serial No. 28,185.

The following examples are given solely for the purpose of illustration only and are not to be construed as limitations of this invention, many apparent variations of which are possible without departing from the spirit or scope thereof.

The following preparations show the synthesis of the starting materials used in this invention.

PREPARATION I

*21-Dimethylaminomethyl-$\Delta^5$-Pregnene-3β,17α-Diol-20-One*

A total of 25 grams of $\Delta^5$-pregnene-3β,17α-diol-20-one was taken up in 350 ml. of methanol containing 12 grams of paraformaldehyde and 40 grams of dimethylamine hydrochloride. The mixture was maintained at 90° C. under pressure for 24 hours. The hot mixture was filtered and the solution evaporated in vacuo. The residue was digested with hot 0.25 N hydrochloric acid, filtered and the filtrate made basic with 10% sodium carbonate. The solution was extracted with chloroform, the organic layer dried over anhydrous sodium sulfate, filtered, and the solvent removed in vacuo to leave the desired product as a residue.

PREPARATION II

*21-Dimethylaminomethyl-$\Delta^5$-Pregnene-3β,17α-Diol-20-One Methyl Bromide*

A solution of 7.5 grams of product prepared in Preparation I in 180 ml. of methanol containing 80 ml. of methyl bromide was allowed to stand overnight and the mixture was then evaporated to dryness in vacuo. The residue was triturated with acetone and the desired product recovered by filtration. An additional crop of the quaternary compound may be obtained by evaporation of the acetone filtrate and this is purified by trituration with methanol and recovered by filtration.

PREPARATION III

*21-Methylene-$\Delta^5$-Pregnene-3β,17α-Diol-20-One*

A solution of 200 mg. of 21-dimethylaminomethyl-$\Delta^5$-pregnene-3β,17α-diol-20-one methyl bromide in 10 ml. of water was prepared and clarified by filtration. To the solution there was added 68 mg. of sodium bicarbonate in 2 ml. of water at 25° C. A white precipitate separated and the suspension was stirred for one hour, filtered, washed with water and dried in vacuo.

PREPARATION IV

*21-Methyl-$\Delta^5$-Pregnene-3β,17α-Diol-20-One*

A total of 1 gram of 21-methylene-$\Delta^5$-pregnene-3β,17α-diol-20-one was taken up in 300 ml. of 95% ethanol containing 250 mg. of palladium on carbon at 25 to 30° C. and hydrogen was bubbled in at atmospheric pressure. Reaction was stopped after 15 minutes and the catalyst removed by filtration. The catalyst was washed with an additional 50 ml. of 95% ethanol and the filtrates combined. It was recrystallized from ethyl acetate; M.P. 237–239° C.

Analysis for $C_{22}$, $H_{34}$, $O_3$:

|  | Calculated | Found |
| --- | --- | --- |
| Carbon | 76.26 | 76.13 |
| Hydrogen | 9.89 | 9.82 |

PREPARATION V

*5α-Bromo-6β-Fluoro-21-Methyl-Pregnene-3β,17α-Diol-20-One*

A total of 0.5 mole of 21-methyl-$\Delta^5$-pregnene-3β,17α-diol-20-one in 300 ml. of methylene chloride was cooled to −80° C. To this mixture, there was added 0.52 mole of N-bromoacetamide and 12.5 moles of anhydrous hydrogen fluoride in 300 ml. of a tetrahydrofuran-methylene chloride solvent mixture containing 120 ml. of tetrahydrofuran. The solvent system of the final reaction mixture contained 20% tetrahydrofuran. The mixture was maintained at −80° C. for 16 hours. It was then poured cautiously into 3 liters of water containing 800 grams of potassium carbonate, the mixture being stirred during the addition. The organic layer was separated and the aqueous layer extracted with two 100 ml. portions of methylene chloride. The combined organic layers were washed with 5% potassium bicarbonate solution until neutral, then with water and finally dried over anhydrous sodium sulfate. The solvent was removed in vacuo to leave the desired product as a residue.

EXAMPLE I

5α,21-Dibromo-6β-Fluoro-21-Methyl-Pregnane-3β,17α-Diol-20-One

A mixture containing 0.5 mole of 5α-bromo-6β-fluoro-21-methyl-pregnane-3β,17α-diol-20-one in 500 ml. of chloroform was treated with an equimolar portion of bromine in 300 ml. of methylene chloride while maintaining the temperature at 0° C. The mixture was kept at this temperature for 4 hours and a slight vacuum was applied to remove substantially all of the hydrogen bromide formed during the course of the reaction. The solution was washed with 5% aqueous sodium carbonate until neutral and then with water. It was dried over anhydrous sodium sulfate, filtered and the solvent removed in vacuo to leave the desired product as a residue.

EXAMPLE II

5α,21-Dibromo-6β-Fluoro-21-Methyl-Pregnane-3β,17α-Diol-20-One

A mixture containing 0.5 mole of 5α-bromo-6β-fluoro-21-methyl-pregnane-3β,17α-diol-20-one in 500 ml. of ethylene chloride was treated with 1.5 molar equivalents of bromine in 300 ml. of octane while maintaining the temperature at 40° C. The mixture was kept at this temperature for one-half hour and a slight vacuum was applied to remove substantially all of the hydrogen bromide formed during the course of the reaction. The solution was washed with 5% aqueous potassium bicarbonate until neutral and then with water. It was dried over anhydrous sodium sulfate, filtered and the solvent removed in vacuo to leave the desired product as a residue.

EXAMPLE III

5α,21-Dibromo-6β-Fluoro-21-Methyl-Pregnane-17α-Ol-3,20-Dione

A total of 20 grams of 5α,21-dibromo-6β-fluoro-21-methyl-pregnane-3β,17α-diol-20-one in 1500 ml. of acetone at 10° C. was treated with 30 ml. of 8 N chromic acid reagent added in one portion with vigorous stirring. After 5 minutes, the reaction temperature rose to approximately 22° C. and the entire reaction mixture was poured into 10 liters of water which caused precipitation of the ketone. The ketone was collected by filtration, washed with water and air-dried. An additional portion of the desired product was isolated by extracting the aqueous filtrate with chloroform, drying the organic layer over anhydrous sodium sulfate, filtering and evaporating the solvent in vacuo.

EXAMPLE IV

5α,21-Dibromo-6β-Fluoro-21-Methyl-Pregnane-17α-Ol-3,20-Dione

To a solution of 5 grams of 5α,21-dibromo-6β-fluoro-21-methyl-pregnane-3β,17α-diol-20-one in 25 ml. of glacial acetic acid, there was added 15 ml. of a solution of chromium trioxide in 9:1 acetic acid-water solution containing 76 mg. of chromium trioxide per ml. of solution. The mixture was kept at room temperature during the addition and for an additional 4 hours. The desired product was precipitated by the addition of water and collected by filtration.

EXAMPLE V

5α,21-Dibromo-6β-Fluoro-21-Methyl-Pregnane-17α-Ol-3,20-Dione

Chromic anhydride (0.125 gram) was added to 15 ml. of pyridine at approximately 5° C. and the mixture allowed to warm spontaneously to room temperature. To this solution there was added 2.5 grams of 5α,21-dibromo-6β-fluoro-21-methyl-pregnane-3β,17α-diol-20-one in 20 ml. of pyridine and the mixture was allowed to stand at room temperature to 24 hours. The solution was extracted with ether and the ether solution washed twice with 5% aqueous hydrochloric acid and then with water. The ether layer was dried over anhydrous sodium sulfate, filtered and the desired product obtained by removal of the ether in vacuo.

EXAMPLE VI

6β-Fluoro-21-Methyl-Δ⁴-Pregnene-17α,21-17α-Ol-3,20-Dione

A solution of 0.5 gram of sodium dichromate dihydrate in 10 ml. of glacial acetic acid was added over a 30-minute period to 0.25 gram of 5α,21-dibromo-6β-fluoro-21-methyl-pregnane-3β,17α-diol-20-one in 50 ml. of 1:1 glacial acetic acid-benzene at 10° C. After 1 hour, an additional 0.3 gram of oxidizing agent in 7 ml. of solvent was added and the mixture left standing for 24 hours at 10° C. It was poured into cold aqueous sodium bisulfite solution and the solution extracted with ether. The organic layer was washed with water until the washings were neutral, dried over anhydrous sodium sulfate, filtered and the ether removed in vacuo to isolate the desired product.

The following preparations illustrate the use of 5α,21-dibromo-6β-fluoro-21-methyl-pregnane-17α-ol-3,20-dione in the preparation of the valuable adrenocortically active steroid, 6α-fluoro-21-methyl-11β,17α,21-triol-3,20-dione 21-acetate.

PREPARATION VI

6β-Fluoro-21-Methyl-Δ⁴-Pregnene-17α,21-Diol-3,20-Dione 21-Acetate

A mixture containing 10 grams of 5α,21-dibromo-6β-fluoro-21-methyl-pregnane-17α-ol-3,20-dione in 400 ml. of acetone was prepared and a 2000% molar excess of sodium acetate in 300 ml. of acetone was added. The mixture was maintained at 40° C. for 24 hours and the solvent removed in vacuo. The residue was washed with water, filtered and dried to yield the desired product.

PREPARATION VII

6α-Fluoro-21-Methyl-Δ⁴-Pregnene-17,21-Diol-3,20-Dione 21-Acetate

A stream of anhydrous hydrogen chloride was bubbled for about 3 hours into a solution of 10 grams of the compound prepared in the previous preparation in 850 ml. of chloroform and 7 ml. of absolute ethanol. The temperature was maintained at −5° C. during the addition. At the end of this period, the solution was diluted with 1500 ml. of chloroform and washed successively with sodium carbonate and water. It was dried over anhydrous sodium sulfate, filtered and the desired product obtained by removal of the solvent in vacuo.

PREPARATION VIII

6α-Fluoro-21-Methyl-Δ⁴-Pregnene-11β,17α,21-Triol-3,20-Dione

A culture of *Curvularia lunata* NRRL 2380 was propagated on an agar nutrient medium. A mixture containing 50 grams of 6α-fluoro-21-methyl-Δ⁴-pregnene-17α,21-diol-3,20-dione 21-acetate together with a 100% excess of sodium carbonate in 1500 ml. of acetone was refluxed for 2 hours. The mixture was then poured into 8 liters of water and the desired product which precipitated was collected by filtration.

What is claimed is:
1. A process which comprises reacting 5α-bromo-6β-fluoro-21-methyl-pregnane-3β,17α-diol-20-one with from about 1 to about 1.5 molar equivalents of bromine in a solvent selected from the group consisting of hydrocarbon and halogenated hydrocarbon solvents containing up to seven carbon atoms and mixtures of these at a temperature of from about 0° C. to about 40° C. for a period of from about one-half to about four hours to produce 5α,21-dibromo-6β-fluoro-21-methyl-pregnane-3β,17α-diol-20-one and oxidizing said compound to produce 5α,21-dibromo-6β-fluoro-21-methyl-pregnane-17α-ol-3,20-dione.

2. A process which comprises reacting 5α-bromo-6β-fluoro-21-methyl-pregnane-3β,17α-diol-20-one with from about 1 to about 1.5 molar equivalents of bromine in a solvent selected from the group consisting of hydrocarbon and halogenated hydrocarbon solvents containing up to eight carbon atoms and mixtures of these at a temperature of from about 0° C. to about 40° C. for a period of from about one-half to about four hours to produce 5α,21 - dibromo - 6β - fluoro - 21 - methyl - pregnane-3β,17α-diol-20-one.

3. A process which comprises oxidizing 5α,21-dibromo-6β-fluoro-21-methyl-pregnane-3β,17α-diol-20-one to produce 5α,21-dibromo-6β-fluoro-21-methyl-pregnane-17α-ol-3,20-dione.

4. 5α,21-dibromo-6β-fluoro-21-methyl-pregnane-3β,17α-diol-20-one.

5. 5α,21 - dibromo - 6β-fluoro - 21 - methyl - pregnane-17α-ol-3,20-dione.

References Cited in the file of this patent

Cutler: Journ. Org. Chem., November 1959, pp. 1629–30.